US005745337A

United States Patent [19]
Reiner

[11] Patent Number: 5,745,337
[45] Date of Patent: Apr. 28, 1998

[54] WIRE BARRIER FOR ELECTRICAL PANEL BOARD

[75] Inventor: Richard A. Reiner, Hanover, Pa.

[73] Assignee: Eaton Corporation, Cleveland, Ohio

[21] Appl. No.: 662,727

[22] Filed: Jun. 10, 1996

[51] Int. Cl.$^6$ .................................................. H02B 1/01
[52] U.S. Cl. ........................................ 361/627; 361/826
[58] Field of Search ........................... 174/72 A, 138 E, 174/138 F; 361/627, 634, 641, 644, 651, 658, 673, 826–828

[56] References Cited

U.S. PATENT DOCUMENTS

| | | | |
|---|---|---|---|
| 3,393,350 | 7/1968 | Gundy et al. | 361/627 |
| 3,906,146 | 9/1975 | Taylor | 361/644 |
| 4,589,794 | 5/1986 | Sugiura et al. | 174/138 G |
| 4,646,198 | 2/1987 | Rich et al. | 361/627 |
| 4,901,204 | 2/1990 | Hayashi | 174/138 D |
| 4,952,158 | 8/1990 | Nakagawa | 174/138 G |

*Primary Examiner*—Gregory D. Thompson
*Attorney, Agent, or Firm*—Martin J. Moran

[57] ABSTRACT

Wire barriers for separating the load wiring from the hot components of an electrical distribution panel board are integrally molded from an elastically deformable resin with a tapered elongated member projecting axially from a base member. Attachments for securing the barriers to the backpan of the panel board include at least two hook members having hook fingers projecting laterally outward in divergent directions. In one embodiment, the hook members are formed in opposite sides of the elongated member and spaced from the base so that as the elongated member is inserted through an opening in the backpan from behind, the fingers grip the backpan and hold the barrier in place until the base is clamped between the backpan and back wall of the panel board as the backpan is installed. In another embodiment of the invention, a pair of opposing facing hook members and a third laterally facing hook member project axially from the base member. The barrier is tilted while the third hook member is inserted in the aperture in the backpan. The pair of oppositely facing hook members are then squeezed together for insertion into the opening while the barrier is rotated upright, so that they also engage the backpan when released.

10 Claims, 4 Drawing Sheets

WIRE BARRIER FOR ELECTRICAL PANEL BOARD

BACKGROUND OF THE INVENTION

1. Field of the Invention

This invention relates to barriers for routing wiring in electrical panel boards and more particularly to molded resin barriers which engage openings in metal panel members forming part of the panel board enclosure.

2. Background Information

Panel boards are metal enclosures for housing circuit breakers such as the miniature circuit breakers commonly used in residential and light commercial applications. Typically, a separate metal pan bolted to the enclosure wall supports a pair of supply side bus strips having stabs which are engaged by pairs of opposed miniature circuit breakers with their load terminals laterally displaced in opposite directions. The load conductors are then connected to these laterally displaced load terminals of the circuit breakers while line conductors are conducted to line terminals at one end of the bus sections. There is a requirement that the load wiring be physically separated from the line terminals. This is commonly accomplished by wire barriers which may take several forms. The simplest form is threaded posts which are secured with nuts to the metal pan to thereby direct the load wiring outside of the line terminals. In another arrangement, a U-shaped molded resin barrier has the base section clamped between the pan and the enclosure wall with the two posts extending upward on either side of the line terminals. Another approach has been a molded pan with integral posts.

There is room for improvement in wire barriers in panel boards. Particularly, there is a need for an improved wire barrier for a panel board which is easier and less expensive to manufacture.

There is a further need for such an improved wire barrier for a panel board which is easier and less expensive to install in the panel board. More particularly, there is a need for such improved wire barrier which remains in position while the panel board is being assembled.

SUMMARY OF THE INVENTION

These needs and others are satisfied by the invention which is directed to a wire barrier for a panel board which is integrally molded with a base member, an elongated member extending axially from the base member, and attachment means for securing the barrier in an opening in a planar member which forms part of the panel board. The attachment means is in the form of elastically deformable integral hook members having hook fingers projecting laterally outward in divergent directions. These hook fingers are sized and axially spaced from the base member to pass through the opening in the planar member of the panel board and clamp the base member against the planar member. Preferably, the elongated member comprises two crossed planar elements which taper from the base member toward a free end.

In a preferred embodiment of the invention, the hook fingers project laterally outward and axially toward the base member from opposite edges of one of the planar elements of the elongated member. In this embodiment, the tapered end of the elongated member is inserted through the opening in the planar member of the panel board with the hook members deforming to pass through the opening and then engaging the planar member adjacent the opening to secure the barrier in place on the panel member. This holds the barrier member in place while the panel member is being secured in the enclosure of the panel board. The panel member has a recess in which the base of the barrier is received so that the base member is clamped between the panel member and the wall of the enclosure of the panel board when the panel member is installed in the enclosure. In this embodiment, the hook members are really only needed to hold the wire barrier in place during assembly of the panel board, as the clamping of the base member between the panel member and the wall of the enclosure ensures permanent retention of the wire barrier.

In another embodiment of the invention, the hook members extend axially from the base member in a direction opposite that of the elongated member with the hook fingers extending laterally outward in opposite directions. Preferably, in this embodiment, there is a third hook member spaced laterally from the first two hook members and having a hook finger which extends laterally outward in a direction generally transverse to the opposite directions of the hook fingers on the first and second hook members. The first and second hook members are elastically deformable so that they may be squeezed together to allow passage of the hook members through the opening in the planar member. Upon release, the hook fingers engage under the edge of the panel member surrounding the opening to secure the barrier in place.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
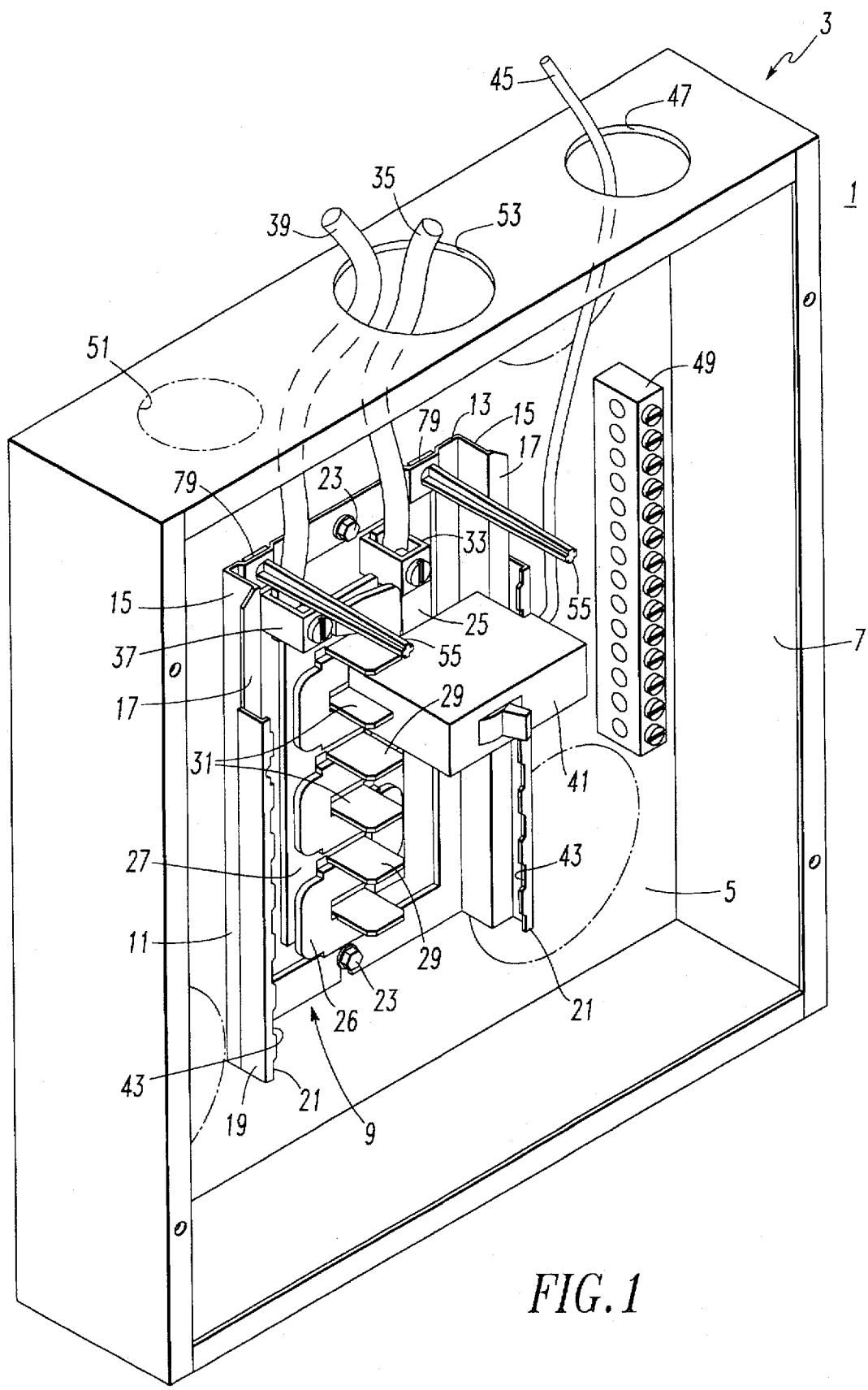
FIG. 1 is an isometric view of a panel board with a front cover removed and incorporating wire barriers in accordance with the invention.

FIG. 1 illustrates an electrical panel board or control center 1 which is known in the art. The panel board 1 comprises an enclosure 3 having a rear wall 5 and side walls 7. The enclosure also includes a front panel with a door (not shown) for access to the enclosure.

Within the enclosure 3 is a subassembly 9 in which includes a backpan 11 with a planar center section 13 and flanges 15 extending outward from the planar section 13 along each side. The flanges are bent outward at their extremities to form outwardly extending ledges 17. Integral channel members are formed on the lower portions of the ledges 17 by outward extensions 19 and inwardly directed lips 21.

The backpan 11 is bolted to the rear wall 5 of the panel board 1 by top and bottom bolts 23.

The subassembly 9 includes a pair of bus plates 25 and 27 mounted on the backpan and insulated from one another by an insulating strip 26. Tabs 29 and 31 bent perpendicular to the bus plates 25 and 27 respectively form stabs which are alternately aligned in a row. A terminal 33 connects the bus plate 25 to one phase conductor 35 to a first phase conductor 35 of an electric distribution system. The other bus plate 27 is connected through terminal 37 to a second phase conductor 39 of the distribution system.

Miniature circuit breakers 41 engage one of the stabs, such as the stab 31 for electrical connection to the corresponding phase conductor, in this case conductor 39. The rear of the circuit breaker engages one of a number of notches 43 in the lip 21 of the backpan 11 to retain the circuit breaker 41 in place. A load conductor 45 connected to the rear of the circuit breaker 41 is routed upward and through a knockout opening 47 in the wall 7 of the panel board 1 and to a load (not shown). A neutral conductor (not shown) from the load passes back through the opening 47 and connected to a neutral strip 49. Additional miniature circuit breakers 41 (not shown) are mounted in the panel board similar to the circuit breaker 41 by connection to one of the stabs 29 or 31. This includes connection of another circuit breaker to the stab 31 to which the circuit breaker shown is connected. The rear of this circuit breaker engages the notch 43 and the lip 21 on the opposite side of the backpan. The load conductors (not shown) where the circuit breaker is mounted in the left side of the panel board extend upward and pass outward through opening 51. In a similar manner, the phase conductor 35 and 39 pass through a center opening 53 in the wall 7 of the panel board 1.

Figure 2:
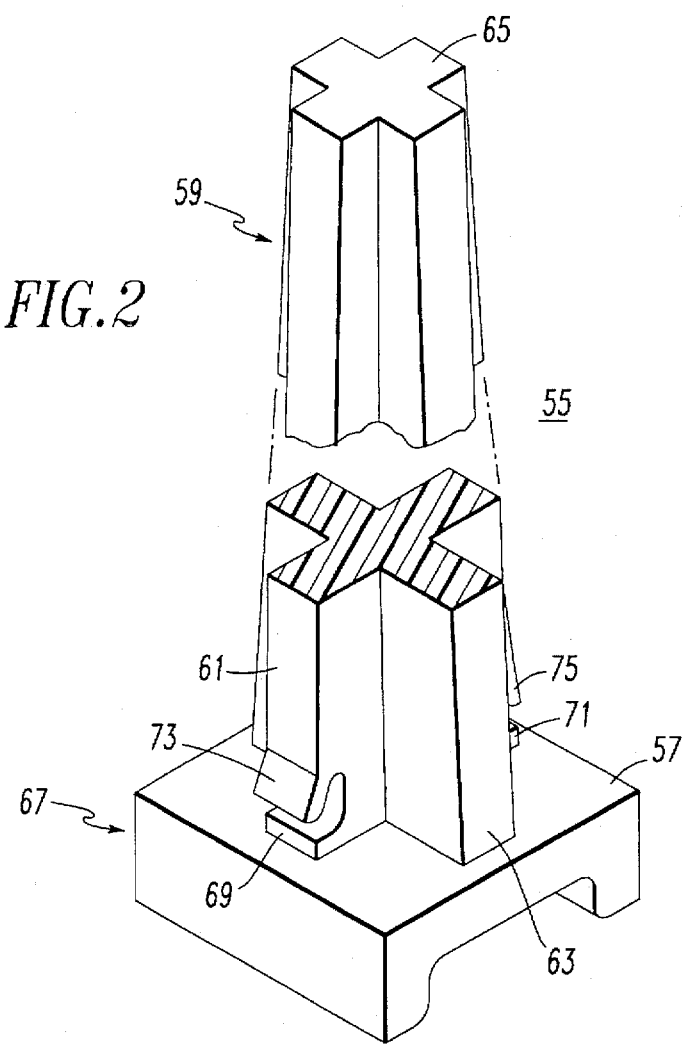
FIG. 2 is an isometric view with a section removed illustrating a first embodiment of the invention.
Figure 3:
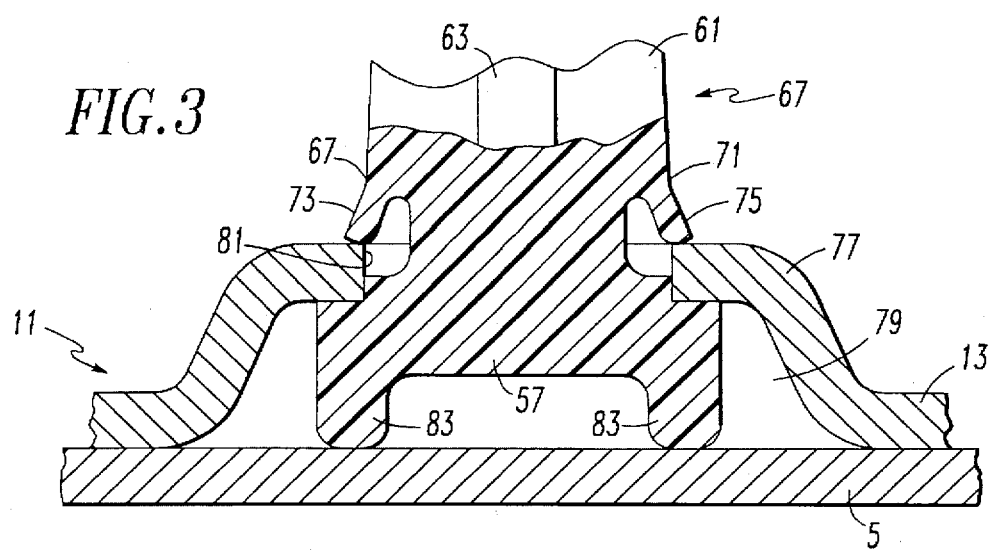
FIG. 3 is an elevation view partially in section of a portion of the panel board and wire barrier of FIG. 2 showing mounting of the barrier.

As described to this point, the panel board 1 is well known in the art. There is a requirement that the load conductors 45, both on the right side as shown in FIG. 1, and on the left side as not shown, be physically separated from and not be in a position to contact the "hot" components which includes the bus plates 25 and 27, of the line terminals 33 and 37 and the phase conductors 35 and 39. In accordance with the invention, this separation is provide by molded wire barriers 55 which project forward from the planar section 13 of the backpan 11 outside of the terminals 33 and 37. The construction and mounting of the wire barrier 55 are shown in FIGS. 2 and 3. This barrier 55 includes a base member 57 and an elongated member 59 projecting axially from the base member. This elongated member is preferably two crossed planar elements 61 and 63 which taper towards a free end 65.

The wire barrier 55 further includes an attachment mechanism 67 in the form of a pair of elastically deformable hook members 69 and 71 having hook fingers 73 and 75, respectively, projecting laterally outward in divergent directions.

As best seen in FIG. 3, the planar section 13 of the backpan 11 has a section 77 which is displaced laterally to form with the rear wall 5 a recess 79. An aperture 81, which is preferably circular, is provided in the displaced section 77.

Before the backpan 11 is bolted to the rear wall 5, the wire barrier 55 is secured to the backpan by inserting the free end 65 of the elongated member 59 through the aperture 81 in the recess 79 from the back side. The fingers 73 and 75 of the hook members 69 and 71 are sized and axially spaced from the base member to deform as they pass through the opening 81 then spring outward to secure the wire barrier 55 to the backpan 11. This firmly secures the wire barrier 55 to the backpan while the backpan is being mounted in the panel board 1. The base member 57 has feet 83 extending along either side which bear against the rear wall 5 when the backpan 11 is bolted into place. The base member is thus firmly clamped in the recess 79 to retain the wire barrier in place.

Figure 4:
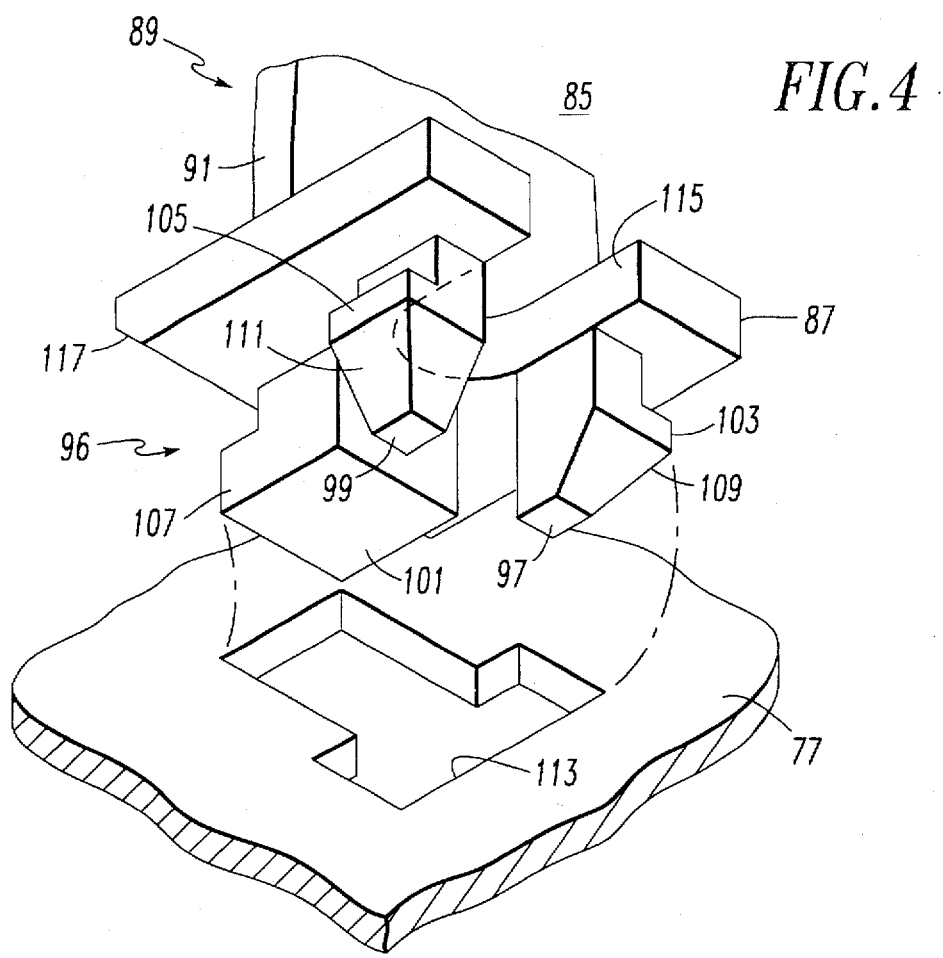
FIG. 4 is an isometric view of the lower end of a wire barrier in accordance with a second embodiment of the invention.
Figure 5:
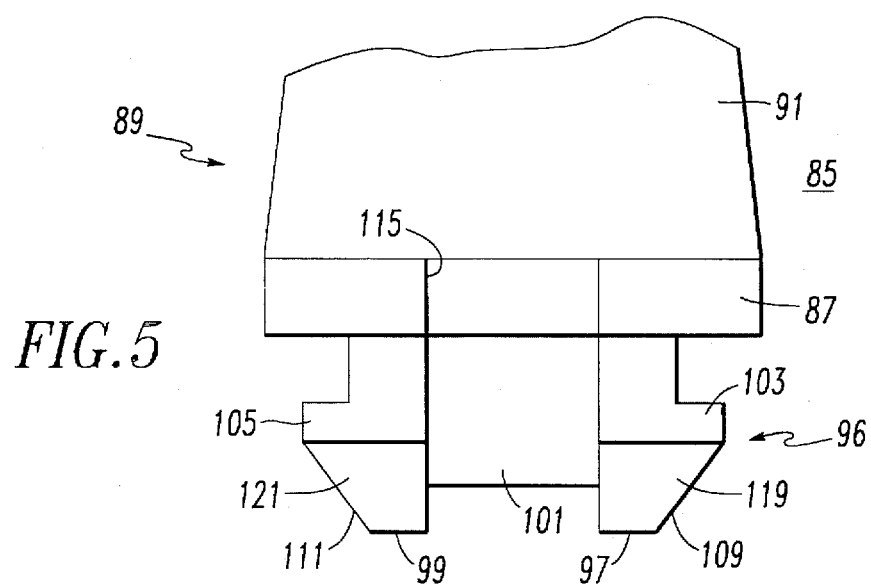
FIG. 5 is a front view of a portion of the barrier shown at FIG. 4.
Figure 6:
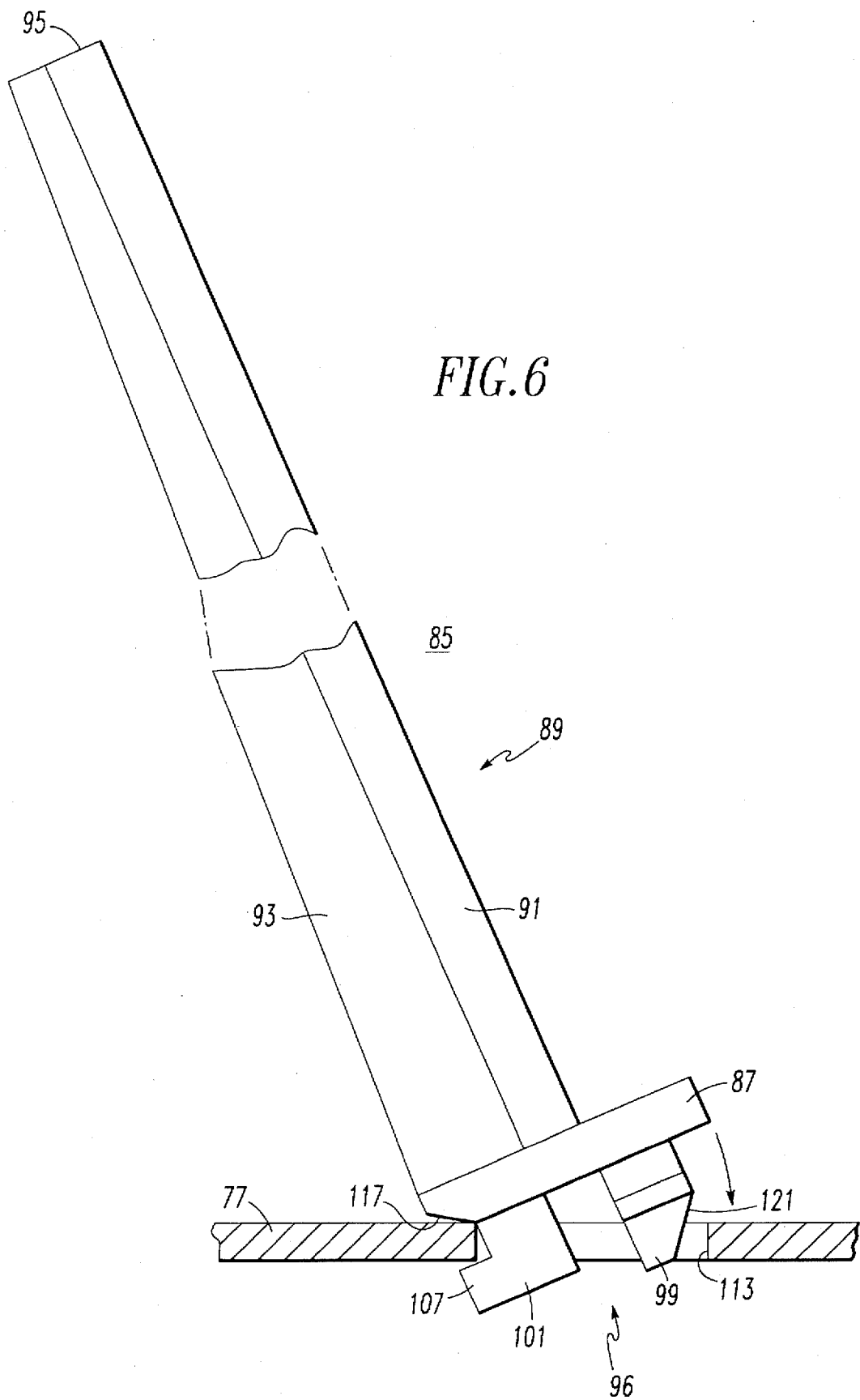
FIG. 6 is a side elevation view illustrating installation of the wire barrier of FIGS. 4 and 5 into a seciton of the panel board of FIG. 1.

A second embodiment of a wire barrier in accordance with the invention is illustrated at FIGS. 4–6. This wire barrier 85 has a base member 87 and an elongated member 89 projecting axially from the base member. This elongated member 89 is preferably formed a first planar element 91 extending across the generally square base member, and a second planar element 93 extending perpendicular from one side of the element 91. The planar elements 91 and 93 taper toward the free end 95. The attachment mechanism 96 includes 3 laterally spaced hook members 97, 99 and 101 extending axially from the base member 87 and having hook fingers 103, 105 and 107 respectively extending laterally outward in divergent directions. The hook fingers 103 and 105 extend laterally outward in opposite directions, while the finger 107 extends laterally outward in a direction generally transverse to the opposed directions of the fingers 103 and 105 and is centered between, but laterally offset from, the hook members 97 and 99. The hook members 97 and 99 are beveled at 109 and 111.

The barrier 85 is mounted on the backpan 11 in the manner illustrated in FIG. 6. The barrier 85 is tilted as shown for insertion of the hook member 101 into T-shape opening 113 (see FIG. 4) in the raised section 77 of the planar section 13 of the backpan 11. The hook members 97 and 99 are squeezed together and the elongated member 89 is rotated upright to insert the hook fingers 103 and 105 through the opening 113. The slot 115 in the base member 87 facilitates this squeezing of the hook members 97 and 99 together. Also, a bevel 117 on the underside of the base member 87 adjacent the hook member 101 and the bevels 119 and 121 on the hook members 97 and 99 provide clearances needed. The hook members 97 and 99 then return to their relaxed positions with the hook fingers 103 and 105 as well as the hook finger 107 clamping the base member 87 against the offset section 77 of the backpan 11. As can be seen, this wire barrier 85 can be inserted and removed from the backpan with the backpan installed in the panel board 1.

The wire barriers 55 and 85 in accordance with the invention are integrally molded from an elastically deformable resin such as polypropolyne or other suitable material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An integrally molded wire barrier for mounting in an opening in a planar member of an electrical load center, said barrier comprising:

a base member;

an elongated member projecting axially from said base member;

attachment means comprising at least two elastically deformable hook members having hook fingers projecting laterally outward in divergent directions, said hook fingers being sized and axially spaced from said base member to pass through said opening in said planar member and clamp said base member against said planar member;

wherein said elongated member comprises two crossed planar elements; and wherein said hook fingers project laterally outward and axially toward said base member from opposite edges of one of said planar elements of said elongated member.

2. The barrier of claim 1 wherein said two crossed planar elements taper from said base member toward a free end.

3. An integrally molded wire barrier for mounting in an opening in a planar member of an electrical load center, said barrier comprising:

a base member;

an elongated member projecting axially from said base member;

attachment means comprising at least two elastically deformable hook members having hook fingers projecting laterally outward in divergent directions, said hook fingers being sized and axially spaced from said base member to pass through said opening in said planar member and clamp said base member against said planar member; and wherein said hook members comprise at least three laterally spaced hook members extending axially from said base member and having hook fingers extending laterally outward in divergent directions, said hook fingers being sized and spaced from said base member to clamp said base member against said planar member.

4. The barrier of claim 3 wherein said hook fingers of first and second of said hook members extend laterally outward in opposite directions and the hook finger of a third hook member extends laterally outward in a direction generally transverse to said opposite directions.

5. The barrier of claim 4 wherein said third hook member is laterally centered between and transversely offset from first and second hook members.

6. In combination:

an electrical panel board comprising an enclosure having a wall section, and a planar member which is secured flat against said wall section, said planar member having an offset section forming a recess between said offset section and said wall section, said offset section having an opening; and wire barrier means for routing wire within said enclosure and comprising:

a generally planar base member;

an elongated member projecting axially from said generally planar base member;

said elongated member being sized to extend through said opening in said offset section of said planar member with said generally planar base member clamped in said recess between said offset section of said planar member and said wall section with said planar member secured to said wall section.

7. The combination of claim 6 wherein said elongated member comprises two crossed planar elements.

8. The combination of claim 7 wherein said two crossed planar elements taper from said base member toward a free end.

9. The combination of claim 8 wherein said wire barrier means includes attachment means comprising a pair of elastically deformable hook members having hook fingers projecting laterally outward in opposite directions from opposite sides of said elongated member, said hook fingers sized and spaced to deform for passage through said opening and to expand and clamp said base member against said offset section of said planar member.

10. The combination of claim 6 wherein said wire barrier means includes attachment means comprising a pair of elastically deformable hook members having hook fingers projecting laterally outward in opposite directions from opposite sides of said elongated member, said hook fingers sized and spaced to deform for passage through said opening and to expand and clamp said base member against said offset section of said planar member.

* * * * *